(12) United States Patent
Reddy et al.

(10) Patent No.: US 6,243,590 B1
(45) Date of Patent: Jun. 5, 2001

(54) METHOD AND APPARATUS FOR SELECTING A VOCODER TYPE FOR USE IN CODE DIVISION MULTIPLE ACCESS

(75) Inventors: Shashi Reddy; Siwei Tang; Ronald Oakes, all of San Diego; Dave Svoboda; William Burum, both of Escondido; Harumi Yamagishi, San Diego, all of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/259,076

(22) Filed: Feb. 26, 1999

(51) Int. Cl.[7] .................................................... H04B 07/26
(52) U.S. Cl. ............................ 455/510; 455/422; 455/450
(58) Field of Search ..................................... 455/422, 450, 455/451, 452, 455, 458, 509, 510, 515, 67.1, 517; 370/320, 329, 331, 335

(56) References Cited

U.S. PATENT DOCUMENTS

| | | | |
|---|---|---|---|
| 5,355,516 | * | 10/1994 | Herold et al. .......................... 455/510 |
| 5,857,147 | * | 1/1999 | Gardner et al. ....................... 455/450 |
| 6,075,778 | * | 6/2000 | Sugita ................................... 455/517 |

* cited by examiner

*Primary Examiner*—Thanh Cong Le
(74) *Attorney, Agent, or Firm*—Blakely, Sokoloff, Taylor & Zafman LLP

(57) ABSTRACT

A method for selecting a vocoder type for origination of a mobile telephone call including sending a first access request that includes a first value representing one of a set of vocoder types including a first vocoder type and a second vocoder type. If the first access request is rejected, then a second access request is sent. The second access request includes a second value representing one of the set of vocoder types other than the one of the set of vocoder types included in the first access request.

18 Claims, 2 Drawing Sheets

METHOD AND APPARATUS FOR SELECTING A VOCODER TYPE FOR USE IN CODE DIVISION MULTIPLE ACCESS

BACKGROUND OF THE INVENTION

1. Field of the Invention

This invention relates to cellular telephones and more particularly to the selection of vocoder standards for Code Division Multiple Access (CDMA) by mobile telephones.

2. Background Information

Cellular and personal communication service (PCS) mobile telephones are low power radio transmitters. Cellular telephones transmit on frequencies between 824 MHz and 849 MHz, while PCS telephones transmit from 1850 MHz to 1910 MHz. Some units can transmit in both the cellular and PCS frequency bands. Mobile telephone service can be provided by broadcasting either analog or digital information. By broadcasting digital information that encodes analog voice messages, the number of messages that can be transmitted in the allocated frequency range can be increased.

CDMA is one standard for providing mobile telephone service using digital encoding. The CDMA standard is specified for cellular frequencies by the Telecommunications Industry Association (TIA) standard IS-95. CDMA for PCS frequencies is specified by American National Standards Institute (ANSI) standard J-STD-008.

Analog voice information is converted to and from a digital encoding by a vocoder (voice encoder and decoder). The CDMA standards do not specify the type of vocoder to be used. Voice coding is a service option allowing a plurality of vocoders to be used within the CDMA standard. For example, current CDMA systems may use a Qualcomm Code Excited Linear Predictive (Q-CELP) vocoder or an Enhanced Variable Rate Coder (EVRC).

When a mobile telephone user wishes to place a CDMA call, the user enters a telephone number and presses a key, such as "send," to signal the telephone to originate a call. The mobile telephone must then establish contact with a base station on an access channel and request an assignment for a traffic channel. Contact is established by sending an access probe that includes the request message. An access attempt may require that access probes with the same message be transmitted more than once before a response from the base station is received by the mobile telephone. Multiple access probes may be required because the position of the mobile telephone could be changing and the initial access probes may not have been received by a base station due to interference that was present at the time the earlier access probes were transmitted. When the base station receives a recognizable access probe from a mobile telephone, the base station broadcasts an acknowledgement to the mobile telephone. The acknowledgement can accept the call and provide a traffic channel, or reject the call. If the call is rejected, the acknowledgement can include instructions for a directed retry, for example directing the mobile telephone to establish a connection using analog services, or simply reject the call.

Included in the CDMA request message is an indication of the type of vocoder that the mobile telephone will use to encode the voice data. The base station must be capable of encoding and decoding voice data using the requested vocoder to successfully complete the call. If the base station does not recognize the requested vocoder, the base station will reject the call. When a user is in their home area, normally they will use a mobile telephone that broadcasts in a format that is compatible with the base stations of their service provider. However, if the user roams to an area serviced by another provider or if their service provider has a large service area with differing service capabilities within the area, the mobile telephone may attempt to establish a call with a base station that cannot handle the vocoder type requested in the access probe.

Certain mobile telephones are capable of using more than one type of vocoder. This permits the phone to be used in more than one service area where the different service areas do not support the use of the same vocoder. However, if the user roams from one area to another, calls cannot be placed until the user recognizes that a different vocoder is required and appropriate steps are taken to program the mobile telephone to use the correct vocoder. This presents three problems: recognition that the user is in a service area that does not recognize the presently selected vocoder, knowing the type of vocoder that is supported, and setting the mobile phone to use the necessary type of vocoder. Accordingly, there is a need for a method and apparatus for a mobile telephone that will overcome the aforementioned problems.

SUMMARY OF THE INVENTION

A method for selecting a vocoder type for origination of a mobile telephone call including sending a first access request that includes a first value representing one of a set of vocoder types including a first vocoder type and a second vocoder type. If the first access request is rejected, then a second access request is sent. The second access request includes a second value representing one of the set of vocoder types other than the one of the set of vocoder types included in the first access request.

DETAILED DESCRIPTION OF THE INVENTION

The present invention provides a method and apparatus for a mobile telephone with the capability to handle calls using code division multiple access (CDMA) using one of at least two vocoder types, where the mobile telephone will adjust the type of vocoder being used to originate calls to match the capabilities of the base station that is providing service for the mobile telephone.

Figure 1:
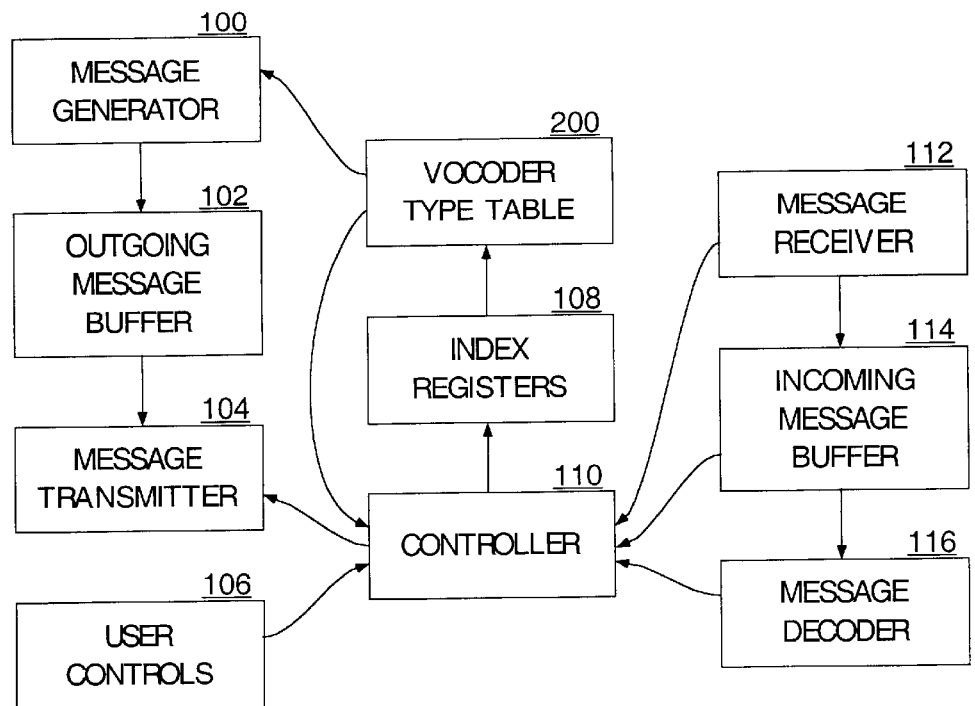
FIG. 1 is a block diagram of an apparatus with one embodiment of the invention.

FIG. 1 illustrates an apparatus for a mobile telephone that includes one embodiment of the invention. Aspects of the apparatus that are not necessary to illustrate the invention have been omitted for clarity.

A controller 110 receives and provides signals to control the function of various circuits in a mobile telephone. The controller 110 also receives data and makes logical decisions to control the function of the circuits.

Figure 2:
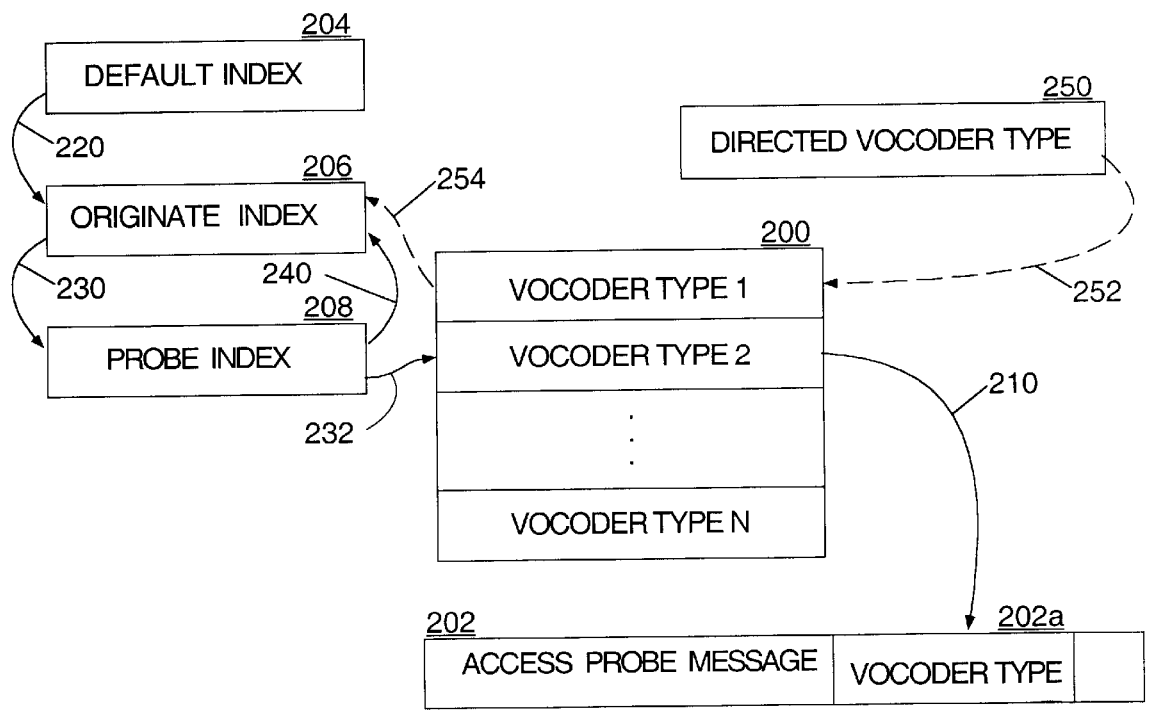
FIG. 2 illustrates the data storage and transfer paths in one embodiment of the invention.

A user places a telephone call by entering the necessary information and signaling that a call should be originated with the user controls 106. To originate a mobile call the mobile telephone must establish communication with a base station on a and obtain an assignment for a traffic channel. Contact is established by sending an access probe on the access channel that includes a request message. As shown in FIG. 2, the access probe 202 includes a vocoder type 202a as part of the request message. The access probe is generated by a message generator 100 that assembles the necessary data in an outgoing message buffer 102. When the message is fully assembled, it is broadcast by a message transmitter 104.

The message generator 100 obtains the data for the vocoder type field 202a from a vocoder type table 200 that contains vocoder type codes for all the vocoder types supported by the mobile telephone. The controller 110 signals a set of index registers 108 to generate an index value that selects a vocoder type value from the vocoder type table 200. The operation of these index registers 108 is explained in detail below.

The mobile telephone further comprises a message receiver 112 that receives messages from the base station which are placed in an incoming message buffer 114. A message decoder 116 responds to the incoming messages in the buffer 114 and signals the controller 110 as to the type of message that has been received. For example, receipt of an accept message would cause the controller 110 to issue the necessary signals to proceed with setting up the call. Certain messages may include data that is needed for further handling of the call. For example, a redirection message may include a vocoder type that must be used to continue the call. The controller 110 retrieves the data, such as the directed vocoder type value, from the incoming message buffer 114 for use in controlling the circuits of the mobile telephone.

FIG. 2 illustrates the vocoder type table 200 and the index registers 108 (FIG. 1) in one embodiment of the invention. The vocoder type table 200 contains an entry for each and every vocoder type supported by the mobile telephone. An entry is selected 232 from the vocoder type table 200 by a select index maintained in a register 208. The select index register 208 is controlled by the controller 110 to select an entry from the vocoder type table 200 as required to originate a call.

The apparatus maintains an originate index register 206 that provides that will provide the vocoder type 202a for the first access probe 202. A non-volatile default index register 204 maintains the index for the entry in the vocoder type table 200 that is set during initial setup programming of the mobile telephone. The default index 204 represents the preferred vocoder type for use in the user's home system. On power on, the controller 110 copies 220 the default index 204 value to the originate index 206. When a call origination is requested by the user, the controller 110 copies 230 the originate index 206 value to the select index 206. In this way, the default index 204 controls the vocoder type 202a that will be used in the first access probe 202 after power on, and the originate index 206 controls the vocoder type 202a that will be used in the first access probe 202 in each call origination. The select index 208 can be modified by the controller 110 to select other vocoder types 202a if additional access probes 202 are required to originate a call.

If the first access probe 202 used in attempting to originate a call results in a reject message that does not provide any directions from the base station, the controller 110 increments the select index 208 to produce a second access probe 202 with a different value in the vocoder type field 202a. When and if the access probe 202 produces an accept message response, the controller 110 copies 240 the select index 208 value to the originate index 206. In this way, the vocoder type 202a that was accepted will be the vocoder type used in the first access probe 202 for the next call origination. If an access probe 202 produces a reject message response, the controller 110 will continue to increment the select index 208 with wrap around until the select index 208 equals the originate index 206, indicating that all vocoder types have been tried.

While a call is in progress, the message receiver 112 may receive a hard handoff message or a redirection message that contains a vocoder type that the base station directs the mobile telephone to use to continue the call. The message will be placed in the incoming message buffer 114 and be decoded by the message decoder 116. The controller 110 will extract the directed vocoder type 250 from the incoming message buffer 114. The controller will then scan the vocoder type table 200 to determine if the requested vocoder type is supported by the mobile telephone and, if so, the index for the vocoder type. If the directed vocoder type 250 matches 252 an entry in the vocoder type table 200, then the index value corresponding to the directed vocoder type 250 will be written 254 to the originate index 206. This will cause the directed vocoder type 250 to be the vocoder type used in the first access probe 202 for the next call origination. The controller 110 will also change the vocoder type being used to continue the call in progress.

While a call is in progress, the message receiver 112 may receive a message that includes a new system identification (SID). When the controller 110 detects a new SID, the controller 110 copies 220 the default index 204 value to the originate index 206. This will cause the default type to be the vocoder type used in the first access probe 202 for the next call origination. When the system providing support for the call changes and no directed vocoder type is received, the capabilities on the new system are undefined. In this situation the mobile telephone reverts to its default vocoder type for the next call origination.

Figure 3:
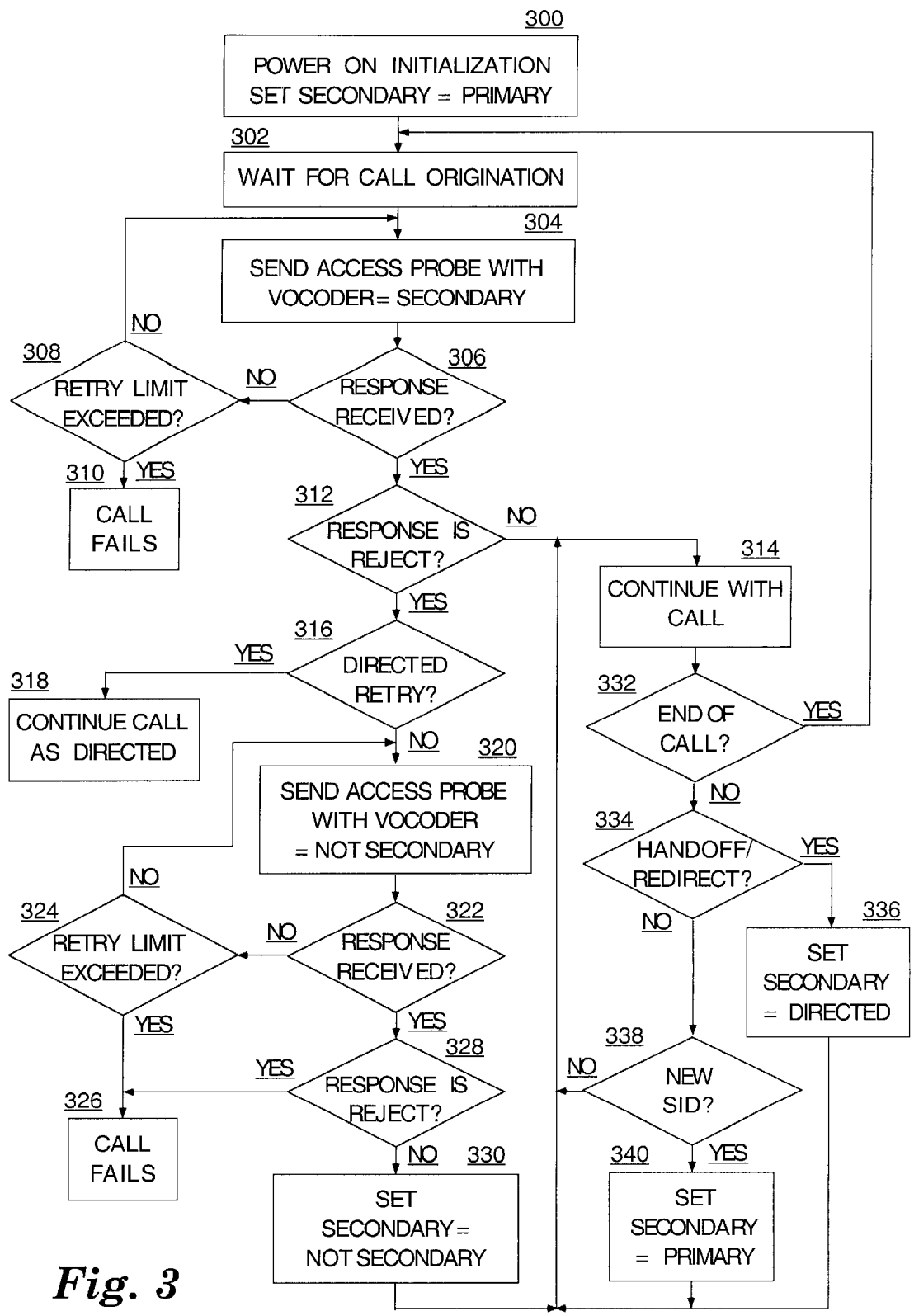
FIG. 3 is a flow chart for an embodiment of the method of the invention.

FIG. 3 illustrates a flow chart for one embodiment of the method of the present invention. A primary vocoder type value is selected during initial setup of the mobile telephone to maintain a selected vocoder type in non-volatile storage that represents the preferred vocoder type. A secondary vocoder type value maintains a vocoder type that should be used when attempting to originate a call. During the power on initialization sequence, the secondary vocoder type value is set to the primary vocoder type value 300. After power on initialization, the mobile telephone waits for the user to request a call origination 302.

When the user of the mobile telephone requests origination of a call, the telephone sends a first access probe that includes a request to use the vocoder type maintained in the secondary vocoder type value 304. The telephone will listen for a response 306 and, if a response is not received and a predetermined retry limit is not yet exceeded 308, send the first access probe 304 again. If no response is received 306 and the retry limit is exceeded 308, then the call fails 310. This would represent a situation where the mobile telephone is unable to establish any type of communication with a base station such as when there is no base station within transmitting or receiving range.

When the mobile telephone receives a response 306, the response is examined to see if the call is accepted or rejected 312. If the call is not rejected, then the mobile telephone will continue to setup the call 314. This represents a successful and normal call origination. If the call is rejected 312, the rejection message is examined to see if the base station is directing the mobile telephone on how to proceed with the call 316. If the base station has provided redirection instructions, then the mobile telephone continues the call as directed 318. This represents a situation where the base station cannot complete the call as requested but has decided to direct the mobile telephone with regard to call completion, for example, directing the mobile telephone to retry the call as an analog call when digital capacity in unavailable but analog capacity is available. If the redirection results in completing the call as a CDMA call, then the call is continued 314 as though it were a successful and normal call origination.

If the call is rejected 312 and no redirection instructions are provided in the rejection message 316, then the mobile telephone will send a second access probe that includes a request to use a vocoder type other than the vocoder type maintained in the secondary vocoder type value 320. The mobile telephone again listens for a response 322 and sends the second access probe 320 again if there is no response and the retry limit has not been exceeded 324. If there is no response to the second access probe then the call will fail 326. This represents a situation where communication was established with the base station during the first attempt to place the call and lost before the second attempt to place the call with an alternate vocoder type was completed.

If a response to the second access probe is not rejected 328, then the secondary vocoder type is set to the vocoder type used in the second access probe 330. The mobile telephone will then continue to setup the call 314. This represents a situation where the mobile telephone has roamed to a service area where the vocoder type that was originally maintained as the secondary vocoder type value cannot be handled by the base stations. The mobile telephone has identified a vocoder type in the second access probe that is handled by the available base stations. The vocoder type so identified is set into the secondary vocoder type value so that origination of subsequent calls will use a first access probe requesting this newly identified vocoder type because it is more likely that the next call will be to a base station with the same vocoder capabilities. During the course of a call, the mobile telephone may receive a hard handoff or a redirection message instructing the mobile telephone to stop using the current traffic channel and to continue the call on a new traffic channel. A hard handoff or a redirection message is used to transfer a call from a first base station to a second base station, such as when the second base station can provide a better signal. The hard handoff or a redirection message may include instructions to use a directed type of vocoder. If the mobile telephone receives an instruction from the base station to use a particular vocoder type 334, then the mobile telephone will begin using the directed vocoder type and the secondary vocoder type value will be set to the directed vocoder type 336. The directed vocoder type is set into the secondary vocoder type value so that origination of subsequent calls will use a first access probe requesting the directed vocoder type because it is more likely that the next call will be to a base station with the same vocoder capabilities.

During the course of a call, the mobile telephone may receive a message that includes a different system identification (SID) then the previous message. This indicates that the call is now being handled by a different provider. If the mobile telephone receives a new SID 338, then the secondary vocoder type value will be set to the primary vocoder type value 340. The primary vocoder type is set into the secondary vocoder type value so that origination of subsequent calls will use a first access probe requesting the primary vocoder type because the base station vocoder capabilities are unknown. By restoring the power on default for vocoder type 332, the preferred vocoder type will be used for call origination 304 in the new system unless such access probes are rejected 312.

Upon completion of a call 332, the mobile call awaits another request to originate a call 302. Subsequent requests to originate a call result in sending a first access probe with the current value of the secondary vocoder type 304. The secondary vocoder type value is updated 330, 336, 340 by operation of the present invention to provide a vocoder type that has an improved likelihood of providing a successful result to the first access probe 304. The present invention further provides for successfully completing the requested call even if the first access probe results in a rejection message 312 by providing for a second access probe using a different vocoder type 320.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for selecting a vocoder for origination of a mobile telephone call comprising:

sending a first access request comprising a first value selected from a set of vocoder type values comprising a first vocoder type value and a second vocoder type value;

receiving a rejection of the first access request;

sending a second access request comprising a second value selected from the set of vocoder type values where the second value is not equal to the first value.

2. The method of claim 1 further comprising:

selecting a primary vocoder type value from the set of vocoder type values;

setting a secondary vocoder type value to be the same as the primary vocoder type value;

selecting the first value to be the secondary vocoder type value.

3. The method of claim 2 further comprising receiving an acceptance of the second access request and then setting the secondary vocoder type value to be the second value.

4. The method of claim 2 further comprising receiving a hard handoff of a call in progress comprising an instruction to use a directed vocoder type having a directed vocoder type value and then setting the secondary vocoder type value to be the directed vocoder type value.

5. The method of claim 2 further comprising receiving a redirection message comprising an instruction to use a directed vocoder type having a directed vocoder type value and then setting the secondary vocoder type value to be the directed vocoder type value.

6. The method of claim 2 further comprising receiving a new system identification and then setting the secondary vocoder type value to be the same as the primary vocoder type value.

7. An apparatus for providing a vocoder type selection code for use in origination of a mobile telephone call comprising:

a message transmitter for sending access request messages comprising a value representing a vocoder type;

a controller, coupled to the message transmitter, for causing the message transmitter to send a first access request message comprising a first vocoder value;

a message receiver, coupled to the controller, for receiving a first response message related to the first access request message and for causing the controller to send a second access request message comprising a second vocoder value that is different from the first vocoder value if the first response message is a first reject message.

8. The apparatus of claim 7 further comprising:

a first register for storing a first value that produces the first vocoder value;

a second register for storing a default value that produces a default vocoder value;

wherein the controller is further coupled to the first register and the second register, for copying the default value from the second register to the first register during power on initialization.

9. The apparatus of claim 8 wherein the controller is further for receiving a second response message related to the second access request message and for causing a second value that produces the second vocoder value to be stored in the first register if the second response message is not a second reject message.

10. The apparatus of claim 8 wherein the controller is further for receiving a hard handoff message and for causing a directed value that produces a directed vocoder value to be stored in the first register if the hard handoff message comprises the directed vocoder value.

11. The apparatus of claim 8 wherein the controller is further for receiving a redirection message and for causing a directed value that produces a directed vocoder value to be stored in the first register if the redirection message comprises the directed vocoder value.

12. The apparatus of claim 8 wherein the controller is further for copying the default value from the second register to the first register if a new system identification is received.

13. A mobile telephone device comprising:

a message generator for sending access request messages comprising a value representing a vocoder type;

a controller, coupled to the message generator, for causing the message generator to send a first access request message comprising a first vocoder value;

a message receiver, coupled to the controller, for receiving a first response message related to the first access request message and for causing the controller to send a second access request message comprising a second vocoder value that is different from the first vocoder value if the first response message is a first reject message.

14. The mobile telephone device of claim 13 further comprising:

a first register for storing a first value that produces the first vocoder value;

a second register for storing a default value that produces a default vocoder value;

wherein the controller is further coupled to the first register and the second register, for copying the default value from the second register to the first register during power on initialization.

15. The mobile telephone device of claim 14 wherein the controller is further for receiving a second response message related to the second access request message and for causing a second value that produces a second vocoder value to be stored in the first register if the second response message is not a second reject message.

16. The mobile telephone device of claim 14 wherein the controller is further for receiving a hard handoff message and for causing a directed vocoder value to be stored in the first register if the hard handoff message comprises the directed vocoder value.

17. The mobile telephone device of claim 14 wherein the controller is further for receiving a redirection message and for causing a directed vocoder value to be stored in the first register if the redirection message comprises the directed vocoder value.

18. The mobile telephone device of claim 14 wherein the controller is further for copying the default value from the second register to the first register if a new system identification is received.

* * * * *